Nov. 25, 1952 F. HAUSER 2,619,105
AUTOMATIC SPRINKLER CONTROL
Filed Aug. 22, 1947 4 Sheets-Sheet 1
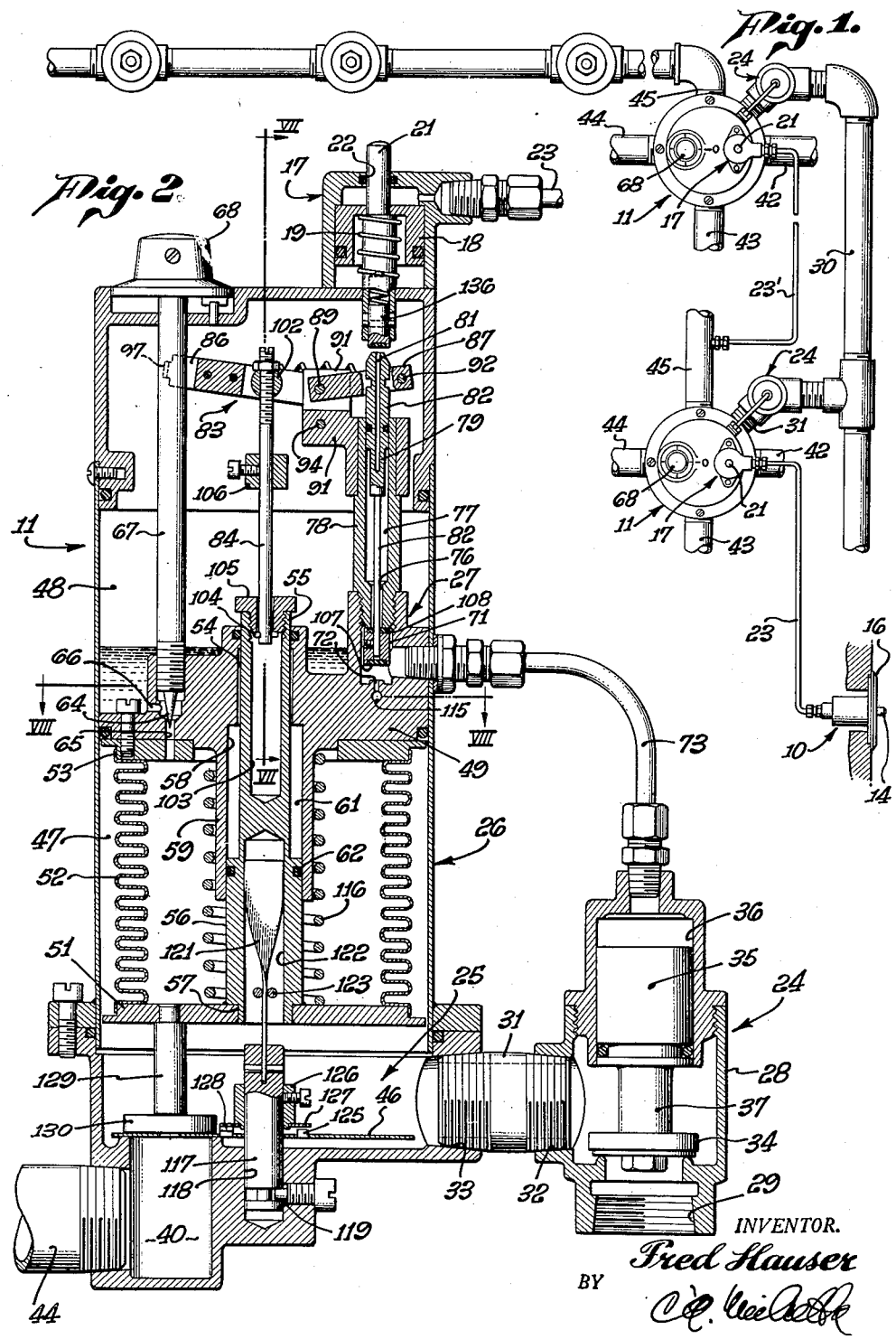
INVENTOR.
*Fred Hauser*
BY
ATTORNEY

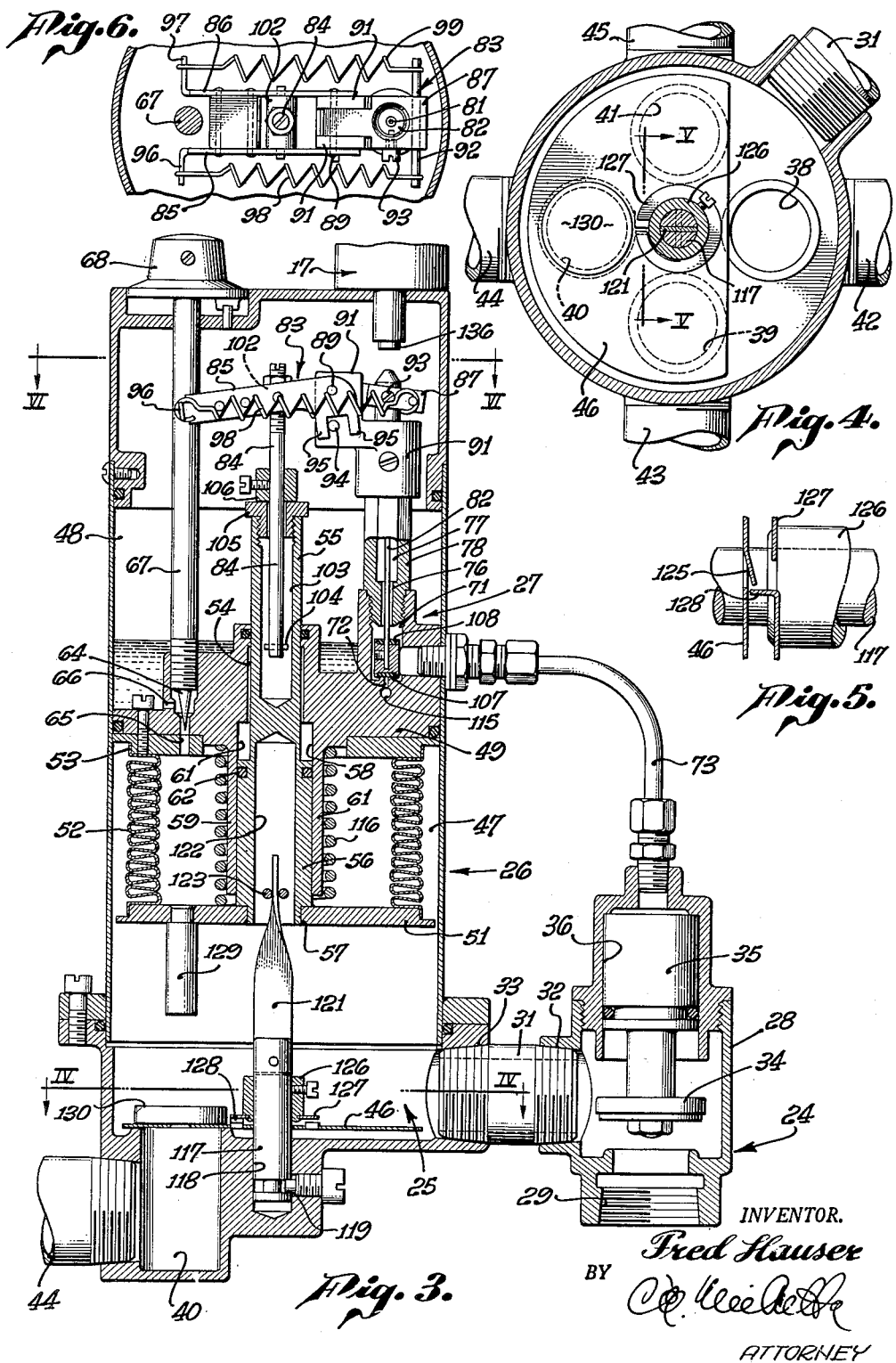

Nov. 25, 1952 — F. HAUSER — 2,619,105
AUTOMATIC SPRINKLER CONTROL
Filed Aug. 22, 1947 — 4 Sheets-Sheet 3
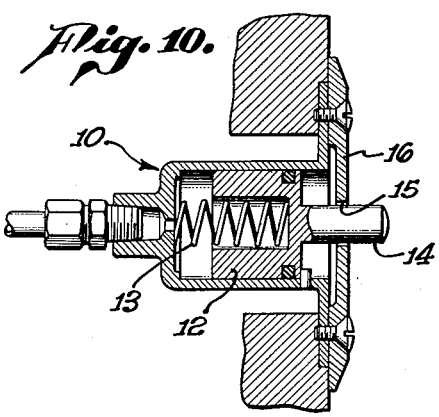
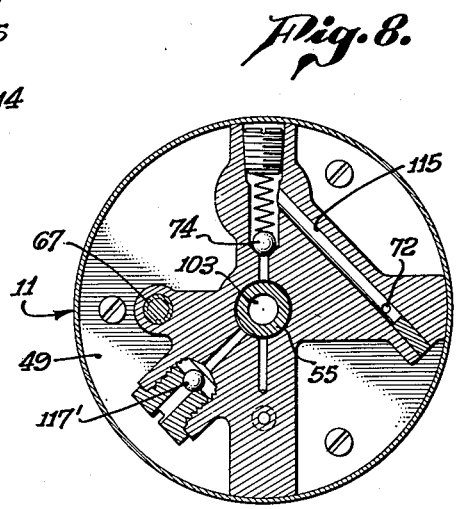
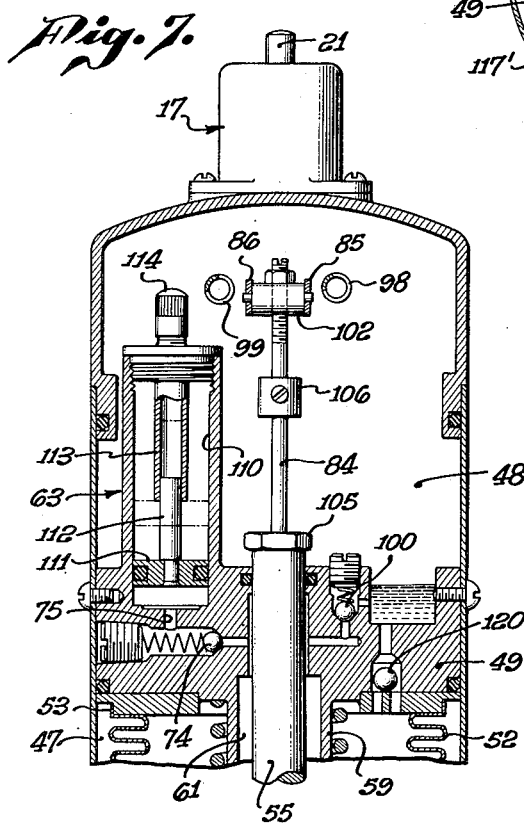
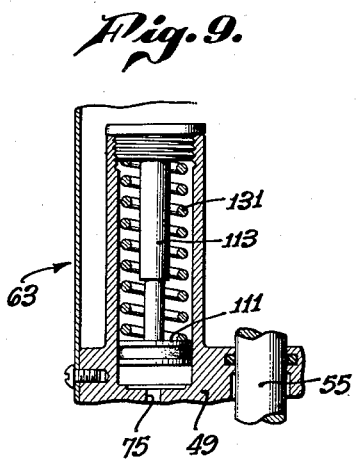
INVENTOR.
Fred Hauser
BY
ATTORNEY Nov. 25, 1952 F. HAUSER 2,619,105
AUTOMATIC SPRINKLER CONTROL
Filed Aug. 22, 1947 4 Sheets-Sheet 4

INVENTOR.
Fred Hauser
BY
ATTORNEY

Patented Nov. 25, 1952

2,619,105

UNITED STATES PATENT OFFICE 2,619,105

AUTOMATIC SPRINKLER CONTROL

Fred Hauser, West Los Angeles, Calif.

Application August 22, 1947, Serial No. 770,023

7 Claims. (Cl. 137—119)

This invention relates to an automatically operated timing mechanism and, more particularly, to a fluid pressure-operated control valve for sequentially supplying water to a series of branch lines from a water main.

The present invention is primarily concerned with the operation of a sprinkler or irrigation system, such as those employed for supplying water to yards, golf courses, orchards, gardens, truck farms and the like. Various and sundry kinds and types of timing and control mechanisms have heretofore been proposed for controlling sprinkler and irrigation systems, but all of such timing mechanisms known to me are unnecessarily complicated and their cost prohibits their use in the smaller systems, such as those employed in yards, lawns and gardens.

Many prior mechanisms employed spring wound or electrically operated clocks and were subject to breakage, electrical short circuits and other disadvantages.

Other prior timing mechanisms employed fluid pressure-control valves and related apparatus and used the water from the water main for their operating fluid. This was objectionable in view of the formation of lime encrustations and the corrosive action of water, particularly in connection with the small operating parts and passages such as are required in such mechanisms. Further, such prior mechanisms required frequent attention from an attendant in order to keep the mechanism in proper operating condition. Therefore, it is a primary object of this invention to provide a control mechanism for a sprinkler or irrigation system that will be of simple construction and design, that will make possible the production of timing mechanisms at a cost proportional to the area to be sprinkled or irrigated, that will operate automatically by the single actuation of a control which may be remotely placed from the mechanism and will be free of the disadvantages of prior devices.

Another object is to provide a mechanism wherein oil or other inert, rust-prohibiting or inhibiting fluid may be employed for actuating the timing mechanism, the water being restricted to the main water lines and valve ports.

Another object is to provide a control valve that will sequentially supply water to a series of branch lines from a main line and which will sequentially actuate a series of like control valves for sequentially supplying water to a series of sets of branch lines.

Another object is to provide a control valve including a closed hydraulic or oil system arranged for operation by the pressure of water from the main supply line.

A further object is to provide a combination of elements whereby the time periods during which the branch lines and the sprinklers associated therewith may be selectively chosen and preset by operating a simple dial.

A still further object is to provide a timing mechanism that will be simple in construction, durable and positive in operation, relatively cheap to manufacture and that will require a minimum cost for maintenance.

The above and other objects will be made apparent throughout the further description of the invention when taken in connection with the accompanying drawings wherein like reference characters refer to like parts. It is to be understood that the drawings are not a definition of the invention but merely illustrate preferred forms by means of which the invention may be effectuated.

Referring to the drawings:

Fig. 1 is a plan view of a timing mechanism embodying the invention illustrating more or less diagrammatically a system composed of a plurality of units containing control valves, branch lines, sprinkler heads and a remote control for setting the mechanism into operation.

Fig. 2 is a vertical, sectional view of a control valve embodying the invention with the various parts shown in their respective positions when the control valve is shut off.

Fig. 3 is a vertical, sectional view similar to Fig. 2, showing the various parts in their respective positions when the control valve is in operation and near the end of one of its cycles.

Fig. 4 is a sectional view taken along the line IV—IV of Fig. 3.

Fig. 5 is a sectional view taken along the line V—V of Fig. 4.

Fig. 6 is a sectional view taken along the line VI—VI of Fig. 3.

Fig. 7 is a sectional view taken along the line VII—VII of Fig. 2.

Fig. 8 is a sectional view taken along the line VIII—VIII of Fig. 2.

Fig. 9 is a sectional view of a modification of a detail shown in Fig. 7.

Fig. 10 is a vertical, enlarged, sectional view taken through the remote controlled starting cylinder shown in Fig. 1.

Figure 11:
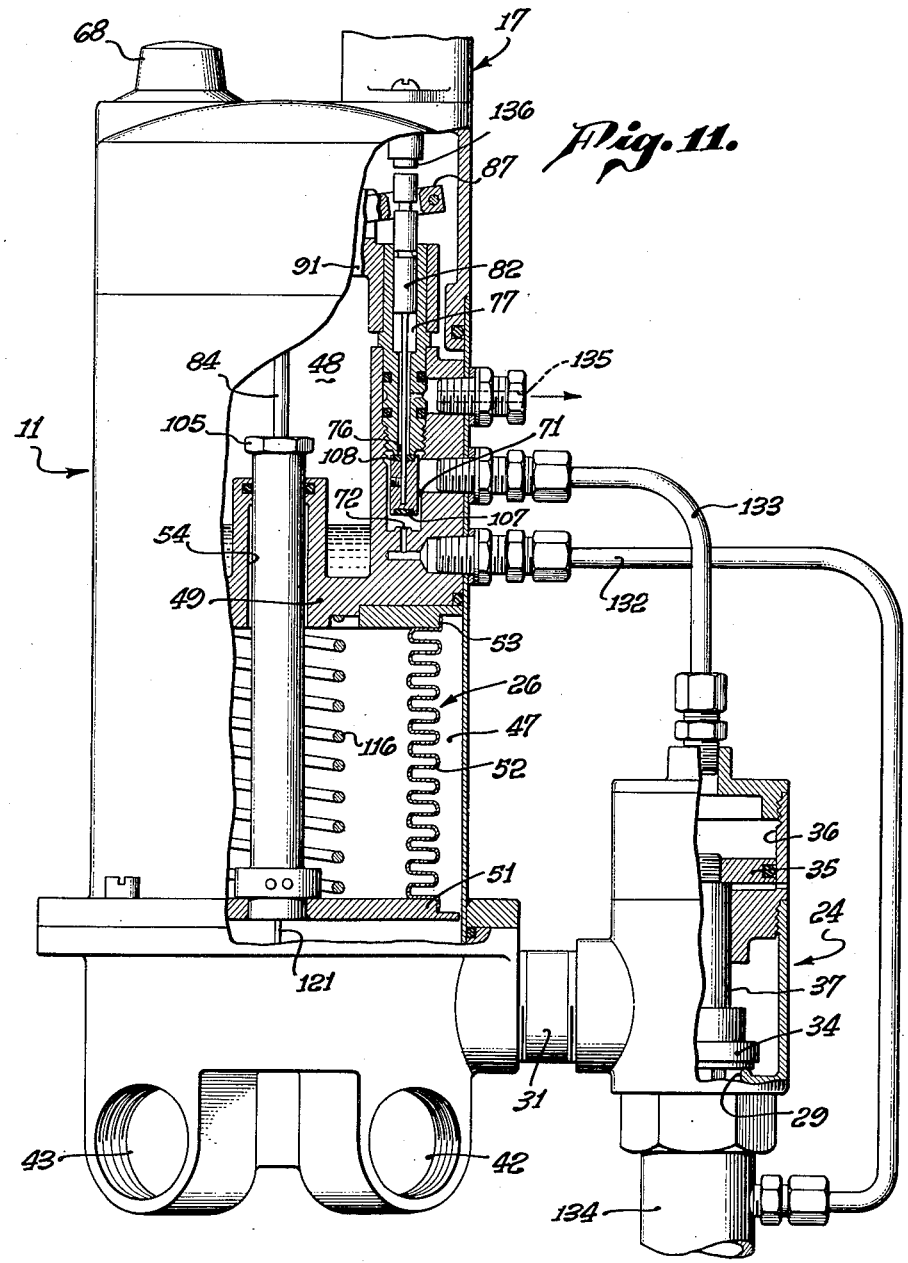
Fig. 11 is a partial, vertical, sectional view of a modified form of a control valve embodying the invention.

Sprinkling systems of this general type frequently consist of several groups of branch lines, each of which contains a series of spaced sprinkler nozzles, each series being connected to a branch line, and each of the branch lines connected to the water main by some type of control means for timing the period in which water is sequentially supplied to the branch lines of each group.

Referring first to Fig. 1 of the drawings, the numeral 10 indicates a starting cylinder located remotely for setting in operation the first of a group of control valves, each of the latter being indicated in its entirety by the numeral 11. The starting cylinder 10 is provided with a piston 12 (see Fig. 10), the latter being biased by spring 13 interposed within the cylinder 10 for biasing an operating pin 14 outwardly through an opening 15 provided by a supporting bracket 16. The pin 14 may be integral with the piston 12 and adapted to urge the piston inwardly into the cylinder by an operator who manually pushes the pin 14 toward the bracket 16. The cylinder 10 is connected to a starting cylinder, represented in its entirety by 17, carried by the first of a group of control valves 11. The cylinder 17 is supplied with a piston 18 and a spring 19 located within the cylinder 17 for urging the piston 18 outwardly. The piston 18 is provided with both a manual and power means for urging the piston 18 inwardly against the spring 19. The manual means consists of a pin 21, which may be disposed through an opening 22 in the head of the cylinder 17 and projects inwardly through the piston into the upper chamber 48. The pin 21 is connected to the head of the piston 18 so that an operator may push the cylinder inwardly so that the inner end of the pin 21 will actuate a pilot valve, later to be described. The power means consists of a tube 23 connecting the remote control cylinder 10 with the cylinder 17 as clearly shown in Fig. 1 of the drawings, the cylinder 10, tube 23 and cylinder 17 being supplied with a fluid pressure medium, such as oil, so that upon actuating the manually operated pin 14 the piston 12 will be urged inwardly of the cylinder 10 and cause the fluid to flow through the tube 23 into the cylinder 17 and urge the piston inwardly for actuating the above-stated pilot valve later to be described.

Each of the control valves 11 consists of a supply valve, represented in its entirety by 24, a distributing chamber, represented in its entirety by 25, a timing cylinder, represented in its entirety by 26, a pilot valve, represented in its entirety by 27 and means controlled by the timing cylinder for actuating the pilot valve.

The chamber 28 of the supply valve 24 is provided with a threaded opening 29 for connection with a water main. The chamber 28 is also connected with the distributing chamber 25 by means of a pipe 31, the latter connecting one side of the chamber 28 with the distributing chamber 25, clearly shown at 32 and 33, respectively. Within the chamber 28 of the supply valve 24 is provided a valve 34 arranged to close intake 29. The valve 34 is connected to a piston 35 disposed in a cylinder 36 by a shaft 37. Fluid pressure is supplied in the cylinder 36 for urging the piston 35 downwardly against the pressure head in the water main 30 and the valve 34 into closing relation with the intake 29 during sequential actuations of the valve for supplying water to branch lines and when it is desired to cut off the device. In the embodiment shown in Figs. 1 to 10, inclusive, oil or other stable, rust-inhibiting fluid is employed in the operating parts of the device as will be later understood.

In the form shown, distribution chamber 25 is provided with four radially spaced, circularly arranged outlets 38, 39, 40 and 41. These outlets are connected to branch lines 42, 43, 44 and 45, respectively. A semicircular disc 46 (see Fig. 4) is provided within the distribution chamber 25 for opening the outlets 38, 39, 40 and 41 sequentially in response to the actuation of the timing chamber 26. The timing cylinder 26 includes a lower chamber 47 and an upper chamber 48. The lower and upper chambers 47 and 48 are separated by a cylinder head 49, and the lower chamber 47 is separated from the distributing chamber 25 by a loosely fitting piston 51.

Within the lower chamber 47 is provided a bellows 52, the lower end of which is closed by the piston 51 and the upper end closed by the lower surface of the cylinder head 49 as shown at 53. The cylinder head is provided with a vertical, central opening 54, through which extends the upper end 55 of a piston rod 56, the piston rod 56 extending through the center of the bellows 52 and having its lower end connected to the piston 51 as shown at 57. The opening 54 within the cylinder head 49 is counterbored at 58, and the cylinder head is provided with a cylindrical sleeve 59 extending downwardly into the bellows 52 and forming with the counterbore 58 a cylinder 61. The reduced portion 55 of the piston rod 56 is smaller in diameter than the cylinder 61, which provides an oil compression chamber within the cylinder 61, the purpose of which will be later understood. The enlarged portion of the piston rod 56 carries an O ring or non-metallic member 62 in sliding engagement with the inner surface of the cylinder 61 and acts as a pump for forcing oil from the cylinder 61 into a pressure chamber or accumulator represented in its entirety by 63 (see Fig. 7).

The bellows 52 of the timing chamber 26 is filled with oil or some other insert liquid, and means including a metering valve 64 is provided for timing the passage of the oil from the bellows 52 into the upper chamber 48 to provide the proper time period during sequential operations of the disc 46 in admitting water to different outlets. The metering valve may consist of a needle point valve 64 positioned to cooperate with an orifice 65 in cylinder head or partition 49, to regulate the oil flowing from the bellows 52 by way of the orifice 65, valve 64 and orifice 66 into the chamber 48. The metering valve 64 is provided with adjusting handle 67 extending upwardly through the top of the upper chamber 48 and with a manually adjustable knob or handle 68.

Formed in the upper part of cylinder head or partition 49 is a pilot valve chamber 71 in communication with a port leading to tube 73 and the top of cylinder 36 of valve 24. An axial port 72 surrounded by an upstanding lip is in the bottom of chamber 71 and communicates with a passageway 115 leading to the back of check valve 74 (see Fig. 8) and then upwardly (see Fig. 7) by channel 75 to the lower portion of pressure cylinder or accumulator 63.

An axial port 76 in the top of chamber 71 also permits communication of top of cylinder 36 through tube 73 and chamber 71 with passageway 77 in pilot valve stem housing 78, orifice 79 and axial passageway 81 of the valve stem 82. The upper part of valve stem 82 is slidably mounted in the housing 78 and includes sealing O rings; the lower part of the valve stem 82 is of reduced diameter and is loosely positioned in axial port 76. A piston provided with valve washers 107 and 108 arranged to seat alternately on ports 72 and 76 is carried on the lower end of stem 82 for movement in chamber 71.

Toggle means represented in its entirety by 83 and actuated by a rod 84 is provided for operating valve stem 82 for opening and closing the ports 72 and 76 (see Figs. 2, 3 and 6). The toggle means consists of spaced, pivoted levers 85 and 86 and an inner cooperating lever 87. The adjacent ends of the levers 85, 86 and 87 are pivoted as shown at 89 to bosses 91 carried by the pilot valve stem housing 70. The outer end of the lever 87 encircles the upper end of the pilot valve stem 82 and is pivotally connected thereto as shown at 93. A cross bar 92 extends through the outer end of the lever 87. The boss 91 is provided with a pin 94, arranged to cooperate with bifurcated inner ends 95 of the pivoted levers 85 and 86 for limiting the toggle movement of the toggle means 83 as best seen in Fig. 3. The outer free ends of the levers 85 and 86 terminate in oppositely disposed, spring engaging elements 96 and 97, respectively. The elements 96 and 97 are connected to opposite ends of the cross member 92 associated with the lever 87 by a pair of spring 98 and 99. It can now be understood that as the springs 98 and 99 are pushed above and below the pivot point 89, the springs will cause the lever 87 and cross member 92 to urge valve stem 82 upwardly and downwardly, respectively.

Means controlled by the timing chamber 26 is provided for actuating the toggle means for raising and lowering the pilot valve stem 82, which means consists of the vertical rod 84 having its upper end threadably connected to a cross piece 102 connecting the members 85 and 86. The upper end 55 of the piston rod 56 is provided with a bore 103 for receiving the lower portion of the rod 84, the lower end of the rod 84 being provided with a cross pin 104 for engaging a sleeve 105 threaded into the upper end of the reduced portion 55 of the piston rod 56. The rod 84 carries an adjustable stop 106 so that as the piston 51 approaches its uppermost position, the sleeve 105 will engage the stop 106 and urge the rod 84 upwardly to swing the toggle springs 98 and 99 above the pivot point 89, thereby causing the springs to lift the toggle member 87 counterclockwise about the pivot point 89 and thereby raising the pilot valve stem 82, the latter being provided adjacent its lower ends with washers 107 and 108. When the valve stem 82 is in its lowermost position, the washer 107 closes the port 72, and when the valve stem 82 is in its uppermost position, the washer 108 closes the port 76. When the valve stem operating rod 84 is in its uppermost position, the valve stem 82 is raised to close the port 76 and prevent passage of the oil from the cylinder 36 in the supply valve 24 to the upper chamber 48 and open the port 72 for connecting the cylinder 36 of the supply valve 24 with the lower portion of the pressure chamber 63.

The pressure chamber or accumulator 63 is provided with a cylinder 110 having a piston 111. The piston 111 is provided with a piston rod 112 guided by a central sleeve 113 projecting downwardly from the top of the cylinder 63. The sleeve 113 limits the upper travel of the piston 111 due to the pressure of the oil from the compression chamber 61. The oil under pressure is supplied to the lower portion of the pressure chamber 63 from the cylinder 61 by way of check valve 74 through orifice 75 in response to the upward movement of the piston rod 56 in the cylinder 61. The sleeve 113 in the chamber 63 limits the upward movement of the piston 111 and any excess fluid flowing from the chamber 61 may pass into the chamber 48 by way of a pressure relief valve 100.

The upper portion of the chamber 110 above the piston 112 may be supplied with air by way of a valve 114 to provide the desired pressure against the piston 111 for forcing the oil within the lower portion of the cylinder 110 back through the orifice 75, orifice 115, valve 72, valve chamber 71, tube 73, into the cylinder 36, forcing the piston 35 downwardly to cause the valve 34 to close the water intake 29. Therefore, it can be understood that as the piston 51 reaches its uppermost position, the oil under pressure from the pressure chamber 63 will cause the valve 34 to close the water supply port 29, at which time the pressure head from the water main will be cut off from the distributing chamber 25 and the pressure within the chamber 25 will fall to atmospheric pressure. A spring 116, provided within the bellows and disposed about the sleeve 59, will urge the piston 51 downwardly, during which time the oil forced into the upper chamber 48 will pass back into the bellows 52 by way of check valve 120 (see Fig. 7), and pass another check valve 117', Fig. 8 into the central opening 54 and the counterbore 58 of the cylindrical sleeve 59, and as the piston 51 approaches the bottom, the sleeve 105 will engage the pin 104 carried by the lower end of the rod 84 and pull the rod downwardly and cause the springs 98 and 99 of the toggle mechanism 83 to pull the cross member 92 downwardly, carrying the pilot valve stem therewith and bringing the washer 107 into closing relation with the port 72, after which time the port 76 will be open and the pressure head of the water main against the valve 34 will raise the piston 35 in the cylinder 36, forcing the oil within the cylinder 36 into the chamber 48 by way of tube 73, pilot valve 71, port 76, orifice 77, orifice 79 and passageway 81. Means is provided for rotating the disc 46 in the distributing chamber the distance from one outlet to the other, which in the present illustration is 90°. The disc is provided with a single opening adapted to sequentially register with the outlets in the distributing chamber. For the purpose of rotating the disc 46 there is provided an index means which consists of a shaft 117, the latter being vertically disposed and turnably supported in an opening 118 provided in the base of the distributing chamber. Any suitable means for turnably supporting the shaft 118 may be employed such as that shown at 119. The upper end of the shaft 118 is provided with a vertically extending, spiral band member 121. The band member 121 extends upwardly into a bore 122 provided in the lower end of the piston rod 56. The spiral band 121 is guided by a pair of spaced pins 123 carried transversely of the piston rod 56 and extending centrally through the bore 122. The spiral band 121 is formed to rotate 90° during the upward movement of the piston rod 56 in a counterclockwise direction, and the band 121 will rotate 90° in a clockwise direction during the downward movement of the piston rod 56. Indexing means consisting of four projections 125, carried by the disc 46 and equally spaced radially about vertical shaft 117, the latter having an adjustable sleeve 126 carrying a spring member 127, is provided for actuating the disc 46. The spring 127 is provided with a downwardly projecting end portion 128 (see Fig. 5) adapted to engage the projections 125 during the clockwise movement of the spiral band 121 and to flex over the projections 125 when the band 121 is turned in a counterclockwise direction. Therefore, it can be understood that as the piston rod 56 moves upwardly, the spring 127 will be turned in a counterclockwise direction and engage one of the projections 125, carried by the disc 46, and during the downward movement of the piston rod 56, the band 121 will rotate the spring 127, the latter being in engagement with the projection 125, and rotate the disc 46 90°, registering the opening in the disc 46 with the next sequential outlet from the distributing chamber.

In order to render the device inoperable at the end of a complete cycle, that is, after the opening in the disc 46 has registered with the number of outlets in the distributing chamber, there is provided a raised plate 130 on the disc 46 arranged to engage a stop member 129 carried by the piston 51. This raised portion 130 cooperating with the stop 129 prevents the piston 51 from reaching its lowermost position and thereby prevents the toggle means from opening the port 76, leaving the pressure of the fluid from the pressure chamber 63 in contact with the piston 35 in the supply valve, the latter operating to hold the valve 34 into closing contact with the water intake 29.

The pressure chamber or accumulator 63 may be provided with a spring 131 instead of the air pressure above described (see Fig. 9), the strength of the spring being selected to afford the desired pressure against the piston 111.

Fig. 11 illustrates a different embodiment of the invention wherein the pressure of the water head is employed for actuating the piston 35 of the supply valve 24. In this embodiment, when the pilot valve stem 82 is moved to its uppermost position, water enters the cylinder 36 of the supply valve 24 by way of the tube 132, pilot valve chamber 71, through the tube 133 and urging the piston 35 downwardly and causing the valve 34 to close the opening 29 from the water supply pipe 134, and when the valve stem 82 is in its lowermost position, the port 72 is closed and the water is cut off from the tube 132 and permitted to pass out of the chamber 36 by way of the tube 133, pilot valve chamber 71, port 76, passageway 77, through any suitable outlet as shown at 135.

The operation of the device, as illustrated in Figs. 1 to 10, inclusive, is as follows. The pilot valve stem 82 is pushed downwardly to close the port 72 and open the port 76. This operation may be accomplished either by the remote control button 14 or the immediate control button 21, as above described. When the port 72 is closed and the port 76 opened, the pressure from the water main through the entrance 29 will urge the valve 34 and piston 35 upwardly, the latter pushing the fluid by way of the pipe 73, pilot valve 71, port 76, passageway 77, orifice 79 and passageway 81 out the upper end of the pilot valve stem 82. The pressure from the water main will then enter by way of the supply valve 24, pipe 31, into the distributing chamber 25, the pressure from the water main urging the piston 51 upwardly and causing the fluid within the bellows 52 to flow by way of the valve 64 into the upper chamber 48.

At the same time fluid within the cylinder 61 is forced into the lower portion of the pressure chamber 63 moving the piston 111 upwardly against the air pressure in the upper portion of pressure chamber 63. As the piston 51 reaches its uppermost position, the sleeve 105 carried by the upper end of the piston rod 56 will contact the sleeve 106 carried by the rod 84, pushing the latter upwardly and causing the toggle means 83 to move the pilot valve stem upwardly, closing the port 76 and opening the port 72 within the pilot valve, after which time the fluid from the pressure chamber 63 may flow into the supply valve chamber 36 by way of orifice 75, orifice 115, port 72 and tube 73. The pressure of the oil from the pressure chamber 63 will urge the piston 35 downwardly and cause the valve 34 to shut off the water supply, during which time the piston 51 will be carried downwardly by the spring 116. The piston rod cooperating with the spiral band 121 will rotate the disc 46 90° and cause the opening in the disc 46 to register with the next outlet in the distributing chamber and the sequence is continued until the raised portion 130 carried by the disc 46 contacts the stop member 129 carried by the piston 51 at the close of each cycle of operation, the control valve becoming inoperative until again set in motion by an operator.

Means is provided for automatic, sequential operation of a series of control valves 11, which means consists of connecting the last outlet of a cycle of operations from a control valve to the starting chamber 17 of the next of a series of control valves (see Fig. 1), wherein the outlet 45 is connected with a starting chamber 17 by way of the pipe 23', the pipe 23' being connected to the starting chamber 17 of the next control valve 11 in the same manner as pipe 23 is connected with the starting chamber 17 in the first control valve. The pressure within the outlet 45 will urge the piston 18 in the starting chamber 17 downwardly against the spring 19 and cause a valve plunger 136 to close the opening 81 in the upper end of the pilot valve stem 82 and simultaneously urge the valve stem 82 downwardly to open the port 76 and close the port 72 and simultaneously move the springs 98 and 99 of the toggle means 83 below the pivot point 89. Notwithstanding the fact that the valve stem and toggle means is in position for actuating the second of a series of valves 11, the pressure within the outlet 45 will maintain the valve plunger 136 in closed relationship with the opening 81 in the pilot valve stem and prevent the passage of oil from the chamber 36 into the upper chamber 48. However, when the first control valve 11 has completed its cycle and the pressure in the outlet 45 is reduced, then the spring 19 in the starting chamber 17 will raise the plunger 136 and permit the oil to pass from the supply valve chamber 36 via the pipe 73, port 76 and out the opening 81 into the upper chamber 48 of the timing cylinder, and the sequence of the second control valve will follow through in the same manner as that disclosed in the manner of the first control valve. Obviously, as many control valves 11 may be hooked into the main line to operate sequentially as may be required.

Accordingly, there is provided a control valve for sequentially supplying water to a plurality of branching lines, wherein a separate fluid is provided for actuating the pilot valve and thereby preventing the rusting and deterioration of the smaller operating parts of the device. Simple manual means are provided for adjusting the flow of oil from the bellows 52 into the chamber 48, whereby the timing of the device may be adjusted in accordance with the water required and simple, automatic means is provided for actuating a series of control valves for supplying water to a series of branch lines containing sprinklers. Also, simple, remote means for setting the system into operation is provided. The device is comparatively simple, and with the non-rusting fluid in contact with the operating parts, the device will operate indefinitely without the necessity of an attendant, except for the actuation of the remote control or direct control for setting the system into operation. The device is simple, durable, efficient in operation and comparatively cheap to manufacture.

While I have illustrated and described certain exemplary forms of the present invention, it will now be apparent to those skilled in the art that certain changes, additions, substitutions and modifications may be made in the invention without departing from the spirit and scope of the appended claims. One such substitution would be the replacing of the bellows 52 by a piston fitted into the timing cylinder 26.

I claim:

1. A timing device for sequentially interrupting the flow of fluid in a conduit comprising: a conduit connected to a source of fluid under pressure; a main valve in said conduit biased open by the pressure of said fluid; pressure actuated means for closing said main valve; movable hydraulic means responsive to fluid pressure downstream of the valve; means biasing the hydraulic means against said downstream fluid pressure; adjustable means for retarding to a selected degree the response of the movable hydraulic means to said downstream fluid pressure; a compression chamber having a volume decreased by movement of said hydraulic means in response to said downstream fluid pressure and increased by opposite movement thereof; a pressure accumulator; conduit means connecting said compression chamber with said pressure accumulator; a passageway connecting said pressure accumulator with said pressure actuated means; a pilot valve in said passageway including means for sequentially applying pressure stored in said accumulator to the pressure actuated means and then releasing pressure therefrom; and means responsive to the approach of said movable hydraulic means to each of its limits of travel for actuating said pilot valve, the limit of travel of said movable hydraulic means in response to said downstream fluid pressure corresponding to actuation of said pilot valve into its first named position.

2. A timing device for controlling the supply of fluid under pressure including: a distributing chamber having a plurality of outlets; a main fluid conduit connecting said chamber to a source of fluid under pressure; a valve in said conduit biased to open position by fluid pressure therein; a valve pressure chamber and an actuating piston therein, said piston being connected to said valve; a pressure accumulator; a timing mechanism including movable hydraulic means actuated by fluid pressure downstream of the valve; resilient means biasing said hydraulic means against said downstream fluid pressure; means actuated by the movement of the hydraulic means for forcing fluid under pressure into said pressure accumulator; a passageway connecting said accumulator with said valve pressure chamber; a pilot valve in said passageway actuatable to sequentially apply accumulated pressure to the actuating piston in said valve pressure chamber and to release pressure therefrom; means for actuating said pilot valve when the movable hydraulic means approaches each of its limits of travel, the limit of travel in response to said downstream fluid pressure corresponding to actuation of said pilot valve into its first named position; a movable closure means in said distributing chamber arranged to open the said outlets one at a time in timed relation with the closing of the valve in said conduit, said closure means being operably connected to said hydraulic means; said hydraulic means including a timing cylinder having two chambers, a cylinder head separating said chambers, a bellows in one of said chambers having one of its ends closed by a piston and its other end closed by said cylinder head, a piston rod within said bellows and connected to said piston, said piston and piston rod adapted to be moved toward said cylinder head by the force of pressure fluid downstream of the valve in said conduit, said cylinder head including selectively adjustable bleeding means whereby the rate of movement of said piston and piston rod may be controlled.

3. A timing device in accordance with claim 2 wherein index means is provided in said distributing chamber for actuating said closure means for sequentially opening the said outlets, said index means being operatively associated with said piston and piston rod whereby axial reciprocating movement of said piston is translated into intermittent movement of said closure means.

4. A timing device for supplying fluid under pressure to a plurality of outlets including: a distributing chamber; a conduit connecting said chamber with a source of pressure fluid; a valve in said conduit biased to open position by the fluid in said conduit; a valve pressure chamber and an actuating piston slidably mounted therein connected to said valve; a timing mechanism including movable hydraulic means responsive to fluid pressure downstream of the valve; adjustable means for retarding to a selected degree the response of said movable hydraulic means; means biasing the hydraulic means against said downstream fluid pressure; a closed hydraulic system including said valve pressure chamber, a compression chamber, a pilot valve, a pressure accumulator, conduit means connecting said compression chamber to said pressure accumulator and a passageway connecting the pressure accumulator to said valve pressure chamber, said pilot valve being disposed in said passageway and actuatable to sequentially apply accumulated pressure to the actuating piston in said valve pressure chamber and to release pressure therefrom; means actuated by the movement of said movable hydraulic means for forcing a portion of the fluid in said closed hydraulic system from the compression chamber into the pressure accumulator under pressure; and means responsive to the approach of said movable hydraulic means to each of its limits of travel to actuate said pilot valve, the limit of travel of said movable hydraulic means in response to said downstream fluid pressure corresponding to actuation of said pilot valve into its first named position.

5. A timing device in accordance with claim 4 wherein said distributing chamber includes a plurality of outlets, a movable closure member arranged to sequentially open one of said outlets at a time, and means actuated by said hydraulic means for moving said closure member to the next outlet of the sequence when pressure on said hydraulic means is relieved due to the valve in said conduit being closed.

6. A timing device in accordance with claim 4 wherein the said distributing chamber contains a plurality of outlets and a movable closure means associated with said outlets, said closure means being operably connected to said hydraulic means to open one outlet at a time in timed relation with the closing of the valve in said conduit.

7. A timing device in accordance with claim 4 wherein said hydraulic means includes a pair of chambers separated by a cylinder head; a bellows in one of said chambers having one of its ends closed by a movable piston and the other end closed by said cylinder head, the face of said piston distant from said cylinder head being subject to fluid pressure downstream of the valve in said conduit; a piston rod within said bellows and connected to said piston having two portions of different diameters, the portion of larger diameter being adjacent said piston head; and an axially extending sleeve carried by said cylinder head and extending into said bellows, said sleeve being coaxial with said piston rod and arranged to form a substantially fluid tight seal with the larger portion of said piston rod, the annular space between the sleeve and the smaller portion of said piston rod constituting said compression chamber.

FRED HAUSER.

REFERENCES CITED

The following references are of record in the file of this patent:

UNITED STATES PATENTS

| Number | Name | Date |
|---|---|---|
| 1,992,877 | Monthan | Feb. 26, 1935 |
| 2,068,102 | Gaines | Jan. 19, 1937 |
| 2,229,829 | Watson | Jan. 28, 1941 |
| 2,361,773 | Knapp | Oct. 31, 1944 |
| 2,368,832 | Hauser | Feb. 6, 1945 |